United States Patent [19]
Fullilove

[11] Patent Number: 5,083,731
[45] Date of Patent: Jan. 28, 1992

[54] PORTABLE HOLDER FOR REFUSE BAG

[76] Inventor: Tom P. Fullilove, P.O. Box 6063, Shreveport, La. 71106

[21] Appl. No.: 601,320

[22] Filed: Oct. 23, 1990

[51] Int. Cl.⁵ ............................................. A63B 55/00
[52] U.S. Cl. ..................................... 248/98; 141/231; 141/316
[58] Field of Search ........................ 248/98, 97, 95, 99, 248/100; 53/390; 141/231, 114, 108, 390, 391, 316

[56] References Cited

U.S. PATENT DOCUMENTS

| | | | |
|---|---|---|---|
| 4,442,567 | 4/1984 | Pravettone | 248/98 X |
| 4,457,483 | 7/1984 | Gagne | 141/390 X |
| 4,601,315 | 7/1986 | France | 141/231 |
| 4,705,246 | 11/1987 | Wolf | 248/97 |

*Primary Examiner*—Carl D. Friedman
*Assistant Examiner*—Korie H. Chan
*Attorney, Agent, or Firm*—Oblon, Spivak, McClelland, Maier & Neustadt

[57] ABSTRACT

A closed frame encompasses an opening complementary to the open end of a refuse bag, has a rear edge defining a lip surrounding the opening and adapted to receive thereover the open end of a refuse bag. The frame has transport wheels on its lower side for supporting the frame above a surface and a ramp extending forwardly and downwardly between the opening and the surface when the frame is on the surface in its position of use. A handle is pivoted to the frame for moving the same while lifting the ramp clear of the surface and an abrasion resistant sheet of a size to accommodate a loaded bag is connected at its forward end to the frame below the opening. The sheet may be at least twice the length of a bag and be foldable over itself and its rear end connected to the frame above the opening, the sheet embracing a bag received on the lip to protect it against damage by abrasion as the frame is moved from place to place.

16 Claims, 1 Drawing Sheet

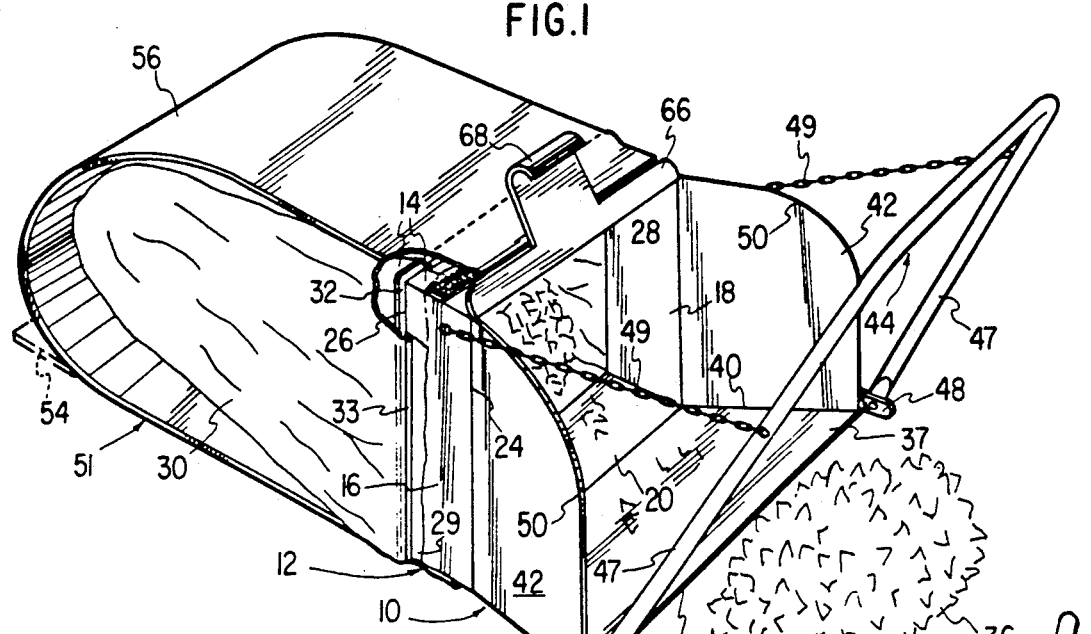
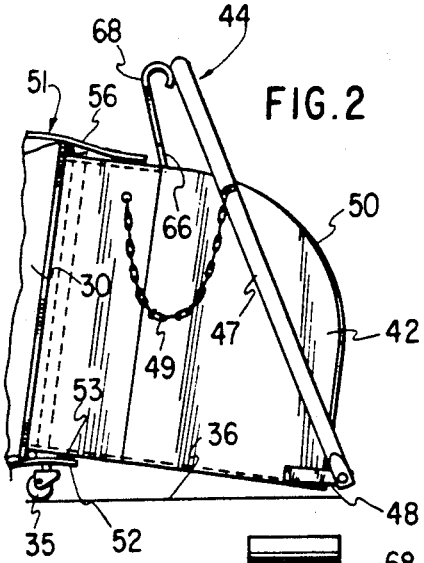
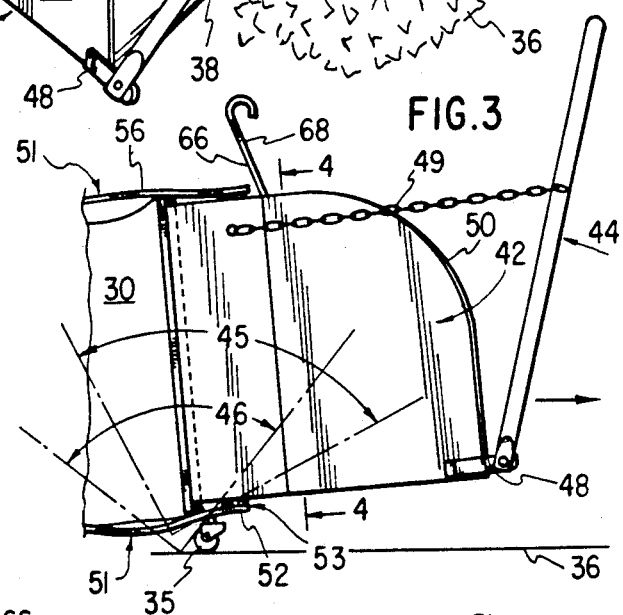
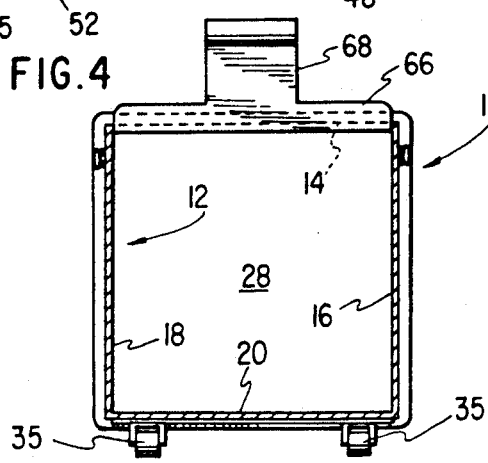
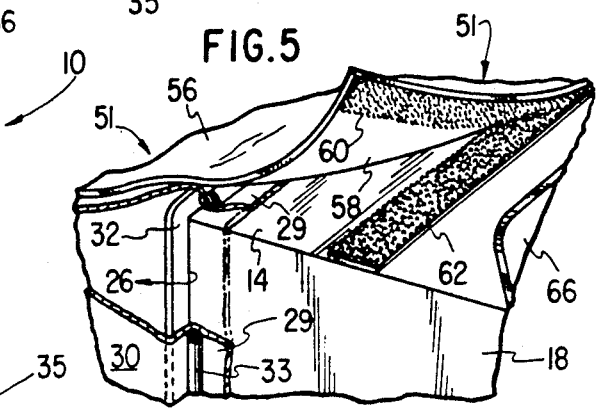

PORTABLE HOLDER FOR REFUSE BAG

FIELD OF THE INVENTION

This invention relates to holders for refuse bags and more particularly, though not exclusively, to holders for refuse bags of the type known as leaf bags.

BACKGROUND OF THE INVENTION

Though it will be apparent that the present invention has a wide variety of uses it will be described primarily as it is used for the reception of raked leaves.

There are on the market over-sized plastic bags especially intended to receive raked leaves. Because these bags are not intended to receive heavy trash such as cans and bottles they are usually of a thin single ply construction which can be easily ripped or punctured. The bags are very limp and because of their large size it is difficult for one person to both hold them open and dump in leaves. Bag holders for the purpose of retaining the bag open have been proposed but they have drawbacks. For example, in the patent to Simpson U.S. Pat. No. 4,884,603 there is disclosed a three-sided bag insert similar to a dust pan. Since leaves ideally are raked up by the use of a fan type rake, when used with a Simpson type holder, the raker must be careful lest the rake strike the unprotected upper edge of the rather flimsy bag and rip it open.

Another problem with prior bag holders is that though they may be provided with means for securely fastening a bag to the holder as shown, for example, in the patent to Dieter U.S. Pat. No. 4,530,533 when the holder, with bag attached, is dragged over rough ground, the bag which is in direct contact with the ground, is very likely to be ruptured. The patent to Pravettone U.S. Pat. No. 4,357,728 provides a bag holder which would cater to this problem so long as the bag is not over-large. Pravettone provides a wheeled frame which completely encompasses the bag and the bag is embraced top and bottom when the frame is on its side, by meshed walls. Were the frame to be of a size to accommodate a conventional leaf bag, the frame would have to be so large as to be unwieldly. Further, because the bag is encompassed on all sides by the frame, the bag is prevented from expanding to a completely filled condition.

BRIEF DESCRIPTION OF THE INVENTION

The present invention comprises a frame composed of top, bottom and side members each having a front edge and a rear edge, the latter defining a peripheral lip for reception of the open end of a bag. For use in raking leaves the frame encompasses an opening complementary in size to the open end of a conventional leaf bag which is telescopically received over the lip and clamped thereto by a flexible strap. A ramp with flared side walls is connected to the front edges of the bottom and side parts of the frame and a pair of wheels, preferably casters are connected adjacent the rear edge of the lower frame part to support the frame and inner end of the ramp above the ground while also permitting the ready transport of the holder by use of an inverted U-shaped handle whose lower ends are pivotally connected to the sides of the ramp adjacent its front end. The bag, when attached to the frame, is not enclosed in a frame but rather, in accordance with the invention, the lower frame member has attached thereto the front end of a flexible sheet of a strong, wear-resistant material such as heavy canvas or plastic on which the bag rests. Thus when the frame is moved by the handle to a new location the sheet with the bag thereon is dragged behind the frame with there being little tendency for the bag to pull off the lip. The sheet may be twice the length of the bag so that its rear end can be folded upward over the bag and releasably attached to the upper frame member. Thus when the handle is manipulated to raise the frame and bag to move debris towards the bag bottom, the latter is supported by the bight in the folded-over sheet to prevent its being split open by a sudden rush of debris against the bag bottom. Because the bag bottom engages the bight, movement of the bag with the frame, particularly when the bag is full or nearly full is assured.

Thus the object of the invention is to provide a bag holder which protects the bag from being struck and damaged by a rake or other tool during loading, is easily transportable from place to place, can be readily elevated to compact debris into the bag, and protects the bag from being damaged as the holder with bag attached is moved over rough terrain.

These and other objects will become apparent as the following detailed description is read in conjunction with the accompanying drawings.

BRIEF DESCRIPTION OF THE DRAWINGS

FIG. 1 is a perspective view of the bag holder constructed in accordance with the invention;

FIG. 2 is a side elevational view showing the holder in a position to receive debris such as leaves;

FIG. 3 is a change position view similar to FIG. 2 but showing the holder in transport position;

FIG. 4 is a vertical cross sectional view taken substantially on the line 4—4 of FIG. 3; and FIG. 5 is an enlarged broken perspective view showing one means for releasably connecting the flexible sheet material to the frame.

DETAILED DESCRIPTION OF THE INVENTION

Referring now to the drawings the numeral 10 refers broadly to the portable bag holder constructed in accordance with the invention. The holder comprises a closed, substantially rigid frame 12 of suitable metal or plastic having a top part 14, side parts 16, 18 and a bottom part 20. These parts have spaced-apart front and rear edges 24, 26 lying in respective parallel planes. The frame parts encompass an opening 28 substantially complementary to the open end 29 of a refuse bag 30, which may be a large leaf bag though the invention is not limited to use with leaf bags since it should be apparent that the frame may be smaller to accommodate smaller bags suited to receiving other debris, for example, floor sweepings. The rear edges 26 of the frame parts define a peripheral lip including a flange 32 or other suitable shape which cooperates with a stretchable strap 33 or the like for retaining the open end 29 of the bag 30 on the lip as best seen in FIG. 5.

Support and transport means, such as the pair of laterally spaced caster wheels 35 shown, are attached to the lower face of the bottom frame part 20 adjacent the rear edge thereof for spacing the frame vertically above a support surface 36, which may be a lawn, and for enabling the frame to be moved easily from place to place. A ramp 37 extends forwardly from the outer edge of the lower frame part 20 and when the frame 12 in its position of use tilts forwardly about the casters 35, until the front edge 38 of the ramp engages the surface 36 as seen in FIG. 2. The ramp 37 has side edges 40 to which are attached the lower edges of side wings 42 whose inner vertical edges are connected to the outer edges 24 of the side frame parts 16, 18. Preferably the side edges 40 of the ramp diverge outwardly and in like manner the wings 42 flare outwardly to define a funnel-like guide for directing debris, such as leaves, through the frame opening 28 and into the bag 30.

Handle means 44 are connected to the holder to enable it to be dragged on the casters 35 from place to place and also to enable the frame to be tilted rearwardly about the casters to various angles, as indicated by the phantom lines 45, 46 in FIG. 3, to cause the debris to flow into the bag. The handle can also be used to elevate the entire holder and bag, or at least the front part thereof, to cause debris to flow towards the bottom of the bag. Preferably the handle 44 comprises an inverted U-shaped member having legs 47 whose lower ends are pivoted to suitable forwardly extending brackets 48 joined to the outer faces of the wings 42 at either end of the front edge 38 of the ramp as best seen in FIG. 1. The legs 47 of the handle intermediate the ends thereof are connected to the side parts 16, 18 of the frame above the mid-point thereof by flexible elements 49 whose purpose will become apparent. The upper edges 50 of the flared wings 42 may be suitably shaped as shown so as not to interfere with the flexible elements when in their stretched condition of FIGS. 1 and 3.

In accordance with the invention, a flexible sheet 51 having a width complementary to the width of the bag 30 and a length at least slightly greater than the length of the bag has its forward end 52 connected to the lower face of the lower frame member 20. The connection, as shown at 53 in FIGS. 4 and 5, may comprise a Velcro strip fixed to the lower frame member and the forward end 52 of the sheet 51 can be provided with a matching strip, it being understood that the forward end 52 is provided with suitable cut-outs to accommodate the vertical spindles of the casters 35.

Though the flexible sheet could terminate slightly beyond the end of the bag 30 as indicated by the dashed lines 54 in FIG. 1, preferably the sheet is slightly longer than twice the length of the bag with its rear part 56 being foldable over the bag as best seen in FIG. 1, the end 58 of that part 56 of the sheet 51 being fastened to the upper face of the upper frame member 14 by Velcro fasteners 60, 62 as best seen in FIG. 5. It should be understood that any suitable releasable fastening means could be employed other than Velcro.

Fixed to the front edge of the upper frame member 14 is a sheet metal member 66 having an upstanding part 68 which is forwardly bent-over as best seen in FIG. 1. This bent-over part serves as a stop for the U-shaped handle 44 as seen in FIG. 2 and also serves as a second handle whereby the entire unit can be picked-up prior to and following use.

In use, the frame 12 is carried by the handle 68 to its place of use. There the lower end 52 of the flexible sheet is fastened to the lower frame part 20 by Velcro 53 or other fastening means, and the open end 29 of the bag 30 is worked over the flange 32 sufficiently far that the stretchable strap 33 can be applied behind the flange 32 firmly clamping the bag end over the lip 26. Assuming the sheet 51 includes the elongate part 56, this is brought over the bag and fastened by the Velcro 60, 62 to the upper frame part 14. The handle 44 is moved to the position of FIG. 2 where it is clear of frame opening 28. When all upward force on the handle 44 is relieved it tilts by gravity to the position of FIG. 4 with the front edge 38 of the ramp engaging the surface 36 in readiness to funnel leaves into the bag 30. The lateral spacing between the side frame parts 16, 18 of the frame is preferably greater than the width of a conventional fan rake thus enabling the user to rake leaves up the ramp and into the bag. Because the leaves will tend to accumulate in the front part of the bag, the user will periodically grasp the handle 44 and tilt the unit rearwardly about the casters to move accumulated leaves at the bag entrance and on the ramp further back into the bag. In order to move leaves to the very bottom of the bag, the user may by means of the handle 44 lift the entire unit and the front end of the bag clear of the ground.

After the user has collected all of the leaves in the vicinity of one location he can move the unit to a new location simply by pivoting the handle to the limits of the flexible elements and then exerting a forward force on the handle. Because the lower ends of the handle legs are pivoted to the ramp adjacent the ends of the outer edge thereof, forward force on the handle tends to lift the forward edge 38 of the ramp and, in fact, were it not for the flexible elements, forward force would tend to lift the frame so far that the wheels would be clear of the ground and the handle and ramp would be in substantial alignment, particularly if the frame were partially anchored by a loaded bag. By connecting the flexible members between intermediate points on the handle legs and points on the frame substantially above the wheels 35 and adjacent the upper ends of the frame side parts, a forward force on the handle causes the flexible elements to tend to rotate the frame about the wheels clockwise in FIG. 3, opposite to the direction which the force on the handle tends to rotate the frame. The length of the flexible elements is selected so that these forces of rotation in opposite direction are substantially balanced at that point where the wheels are firmly engaged with the surface and the ramp is raised above the surface.

As the unit is moved forwardly, the heavy flexible sheet moves with it ensuring that the bag also moves but without being in abrading contact with the ground. Should the bag be very full and the unit be moved along a slope where the bag might otherwise tend to fall to one side off the sheet 51, such movement is restrained by engagement of the lower end of the bag with the bight of the folded-over sheet. It is also within the purview of the invention to provide the sheet with side restraints such as straps or by pouching the sheet sufficiently to restrain accidental movement to one side of a filled or partially filled bag, but without restricting the ability of the bag to expand to its maximum capacity when fully loaded.

It is also within the purview of the invention for the handle 44 to be easily demountable, the ramp to fold upwardly and the wings to fold either rearwardly parallel to the outer faces of the side parts 16, 18 or forwardly in front of or behind the folded ramp. The ramp could be provided with brackets similar to brackets 48, and pins and spring type cotter pins could simultaneously connect the respective sets of brackets and the lower ends of the handle together prior to use.

It will thus be seen that the invention is susceptible to a variety of changes and modifications without, however, departing from the scope and spirit of the appended claims.

What is claimed is:

1. A portable holder for a refuse bag comprising a closed frame having a rear edge defining a peripheral lip adapted to receive thereover the open end of a bag, said frame encompassing an opening substantially complementary in size to the open end of a refuse bag when received over said lip, transport means attached to said frame forwardly of said rear edge for vertically supporting said frame above a surface and for enabling said frame to be moved on said surface, said frame including forwardly extending ramp means adapted to slope downwardly and forwardly between said opening and said surface when said frame is supported by said transport means in its position of use above said surface, and handle means connected to said holder in a position enabling said frame to be transported on said transport means in a forward direction over said surface with said ramp raised thereabove when a forward force is exerted on said handle means, and to be tilted rearwardly about said transport means when an upward force is exerted on said handle means.

2. The portable holder of claim 1 wherein no part of said frame extends rearwardly of said lip so that no part of said frame other than said lip is in a position to be engaged by any part of said bag when its open end is received on said lip.

3. The portable holder of claim 1 including a flexible sheet of abrasive resistant material having front and rear ends, and a width and length at least equal to the corresponding dimensions of said refuse bag, and means for connecting the front end of said sheet to said frame below said opening and in said position to be engaged by said bag and prevent it from touching said surface when the open end of the bag is received on said lip.

4. The portable holder of claim 3 wherein the length of said sheet is at least twice as long as said bag, and means for connecting the rear end of said sheet to said frame above said opening when said sheet is folded over itself.

5. The portable holder of claim 1 wherein said transport means comprises a pair of laterally spaced wheels.

6. The portable holder of claim 5 wherein said wheels are caster wheels.

7. The portable holder of claim 5 wherein said wheels are connected to said frame adjacent the rear edge thereof.

8. The portable holder of claim 1 wherein said ramp has diverging side edges, and a pair of outwardly flaring wings on opposite sides of said opening, each wing having a lower edge connected to a respective one of said ramp side edges and a vertical inner edge connected to said frame on the respective opposite sides of said opening.

9. The portable holder of claim 1 wherein said ramp includes a front edge engageable with said surface when said holder is in its position of use on said surface, said handle means comprising an inverted U-shaped handle having legs, means pivotally connecting the lower ends of said legs with said ramp adjacent the opposite ends of the front edge of said ramp, and flexible elements connecting said legs intermediate the ends thereof with said frame on opposite sides of the opening and at a substantial distance above said support means, said flexible elements having a length limiting the forward movement of said handle relative to said frame such that a forward force on said handle for moving said holder on said surface and tending to cause said frame to rotate rearwardly is substantially balanced by the force exerted on said frame by said flexible element tending to rotate said frame forwardly, but only after the front edge of said ramp has been raised clear of said surface.

10. The holder of claim 1 wherein said rear edge of said frame is shaped to cooperate with the front edge part of said bag when received over said shape and clamped thereto by flexible strap means to resist axial separation of said bag from said frame.

11. The holder of claim 10 wherein said shape is an outwardly extending flange.

12. The holder of claim 9 including vertical stop means extending upwardly from said frame in a position to be engaged by said handle when moved in a direction toward said frame.

13. The holder of claim 12 wherein said vertical stop means includes, in addition, second handle means whereby said holder may be lifted for bodily transport clear of said supporting surface.

14. The holder of claim 8 wherein said side wings and the side edges of said ramp flare angularly outwardly.

15. The holder of claim 1 wherein said rear edge of said frame includes a shape which cooperates with the front edge part of a bag when received over said shape to resist axial separation of said bag from said frame.

16. The holder of claim 15 wherein said shape is a peripheral upstanding flange.

* * * * *